March 17, 1925.

B. K. BOWEN

INTERNAL COMBUSTION ENGINE.

Filed Jan. 3, 1923   5 Sheets-Sheet 1

1,529,687

Inventor
B. K. Bowen

March 17. 1925.

B. K. BOWEN 1,529,687

INTERNAL COMBUSTION ENGINE

Filed Jan. 3, 1923     5 Sheets-Sheet 2

March 17, 1925.

B. K. BOWEN 1,529,687

INTERNAL COMBUSTION ENGINE

Filed Jan. 3, 1923    5 Sheets-Sheet 3

Inventor
B. K. Bowen

March 17, 1925.

B. K. BOWEN 1,529,687

INTERNAL COMBUSTION ENGINE

Filed Jan. 3, 1923      5 Sheets-Sheet 5

Inventor
B. K. Bowen

By
Attorney

Patented Mar. 17, 1925.

1,529,687

UNITED STATES PATENT OFFICE.

BENJAMIN K. BOWEN, OF HAMPTON, IOWA.

INTERNAL-COMBUSTION ENGINE.

Application filed January 3, 1923. Serial No. 610,502.

*To all whom it may concern:*

Be it known that I, BENJAMIN K. BOWEN, a citizen of the United States, residing at Hampton, in the county of Franklin and State of Iowa, have invented certain new and useful Improvements in Internal-Combustion Engines, of which the following is a specification.

My invention relates to improvements in internal combustion engines.

Objects of my invention are to provide means for obtaining the maximum leverage throughout the entire power stroke, to lengthen or shorten the leverage according to the work to be done, to provide a construction which is extremely light and simple, to provide an engine which may be operated with steam, compressed air, or gas, to reduce vibrations to the minimum, to provide an engine wherein the length of the cylinder may be varied, to provide means for expelling the products of combustion at the end of each exhaust stroke, to provide a sliding valve for controlling the inlet and exhaust of gases to and from the cylinder, thereby eliminating springs, poppet valves, and other parts which create noise, to provide an engine having its operating parts readily accessible for lubrication, to provide an engine which operates with a high degree of efficiency, wherein the formation of carbon in the cylinder is reduced to the minimum, with a corresponding reduction in liability of pre-ignition.

Other objects and advantages of the invention will be apparent during the course of the following description.

Figure 1:
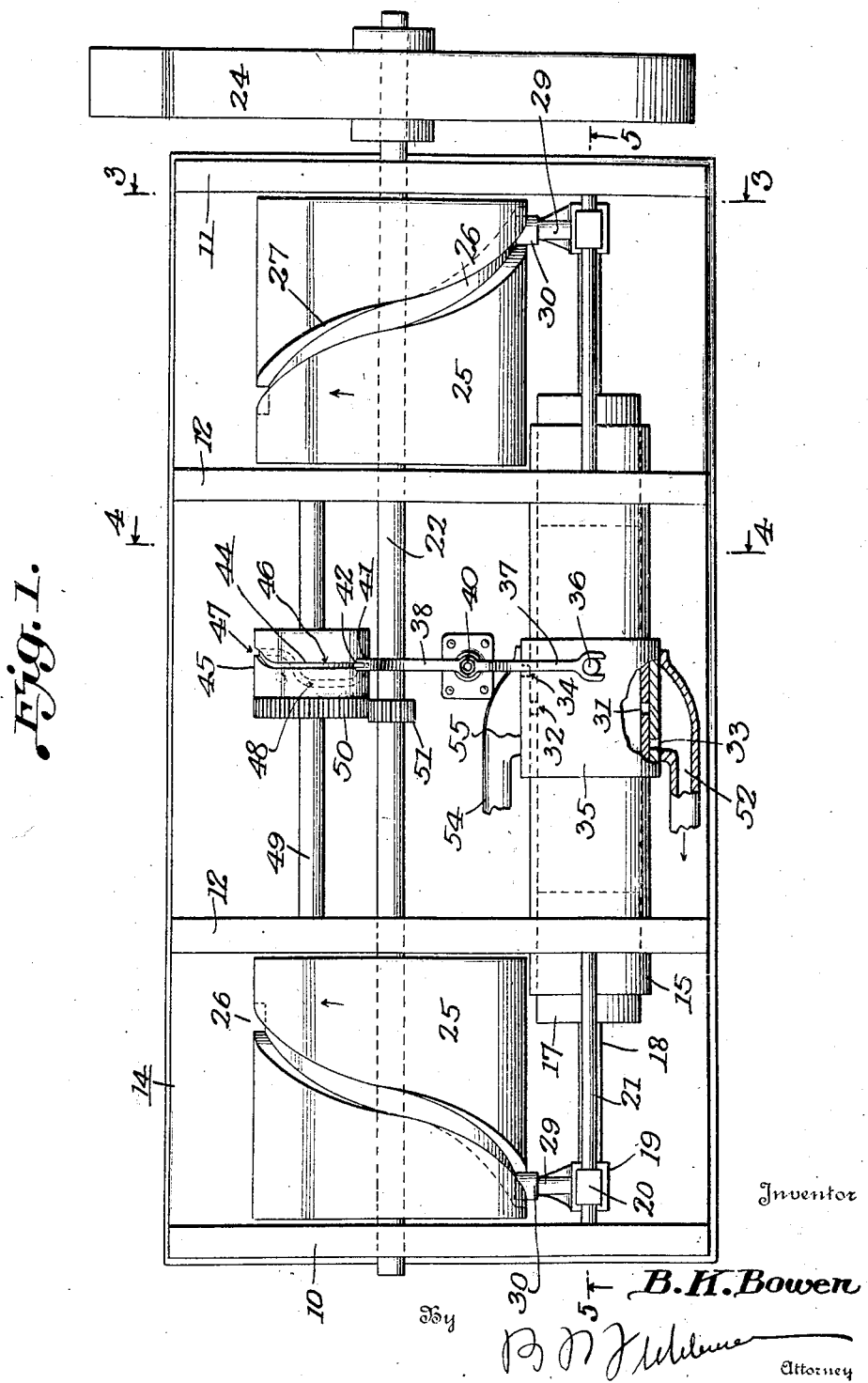
Figure 2:
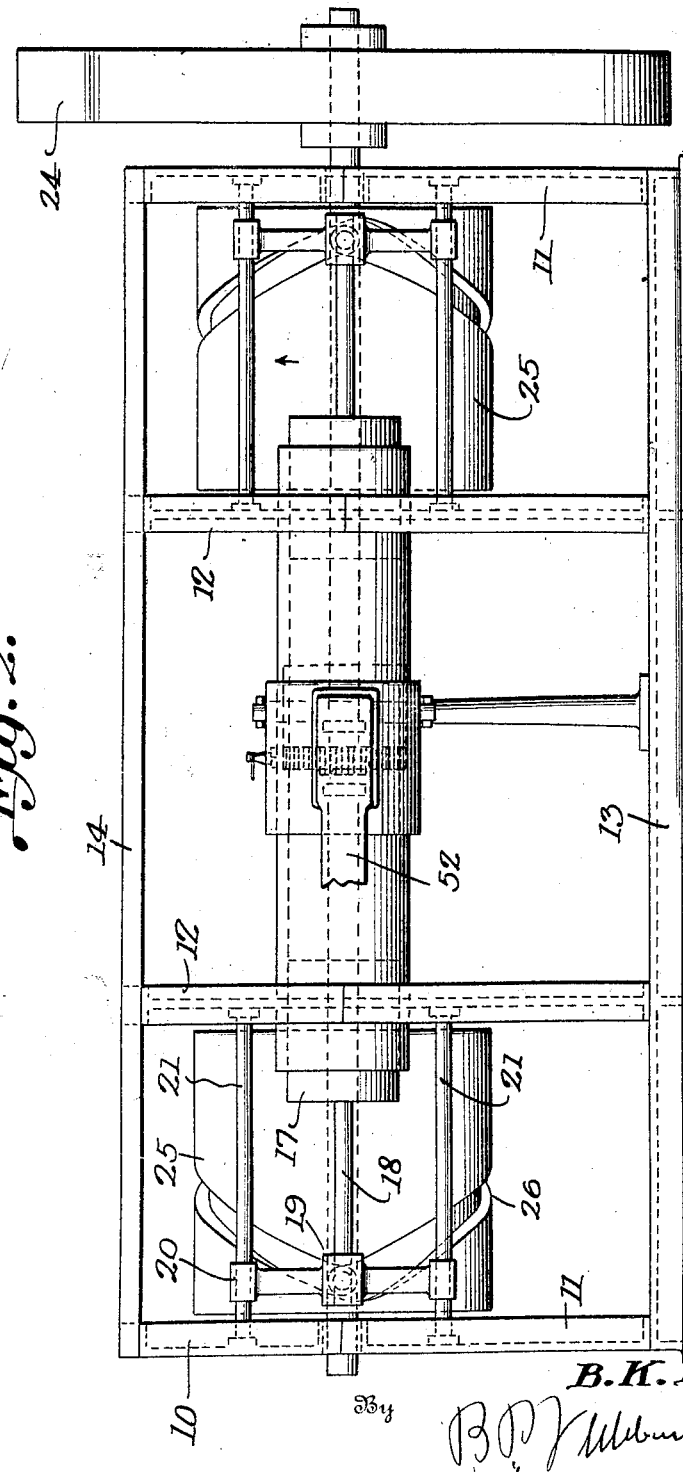
Figure 3:
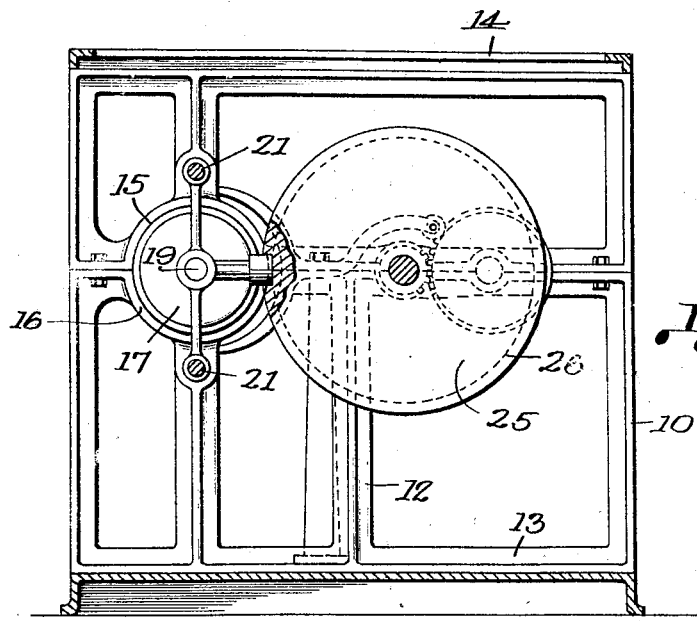
Figure 4:
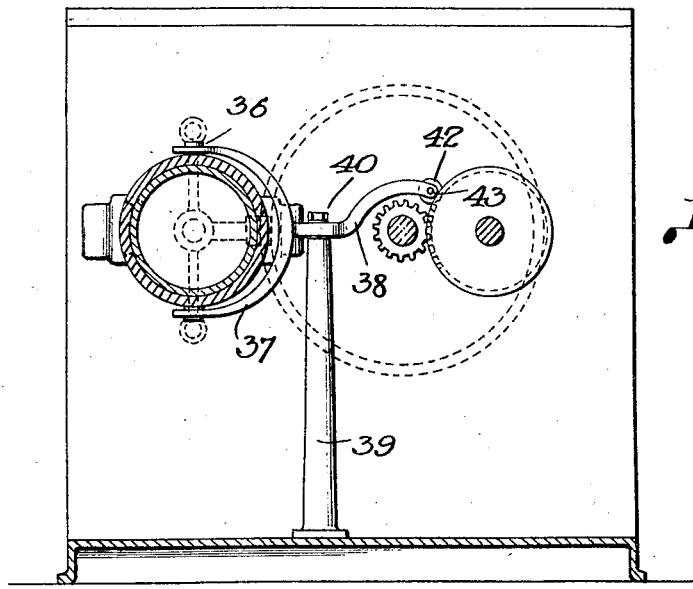
Figure 5:
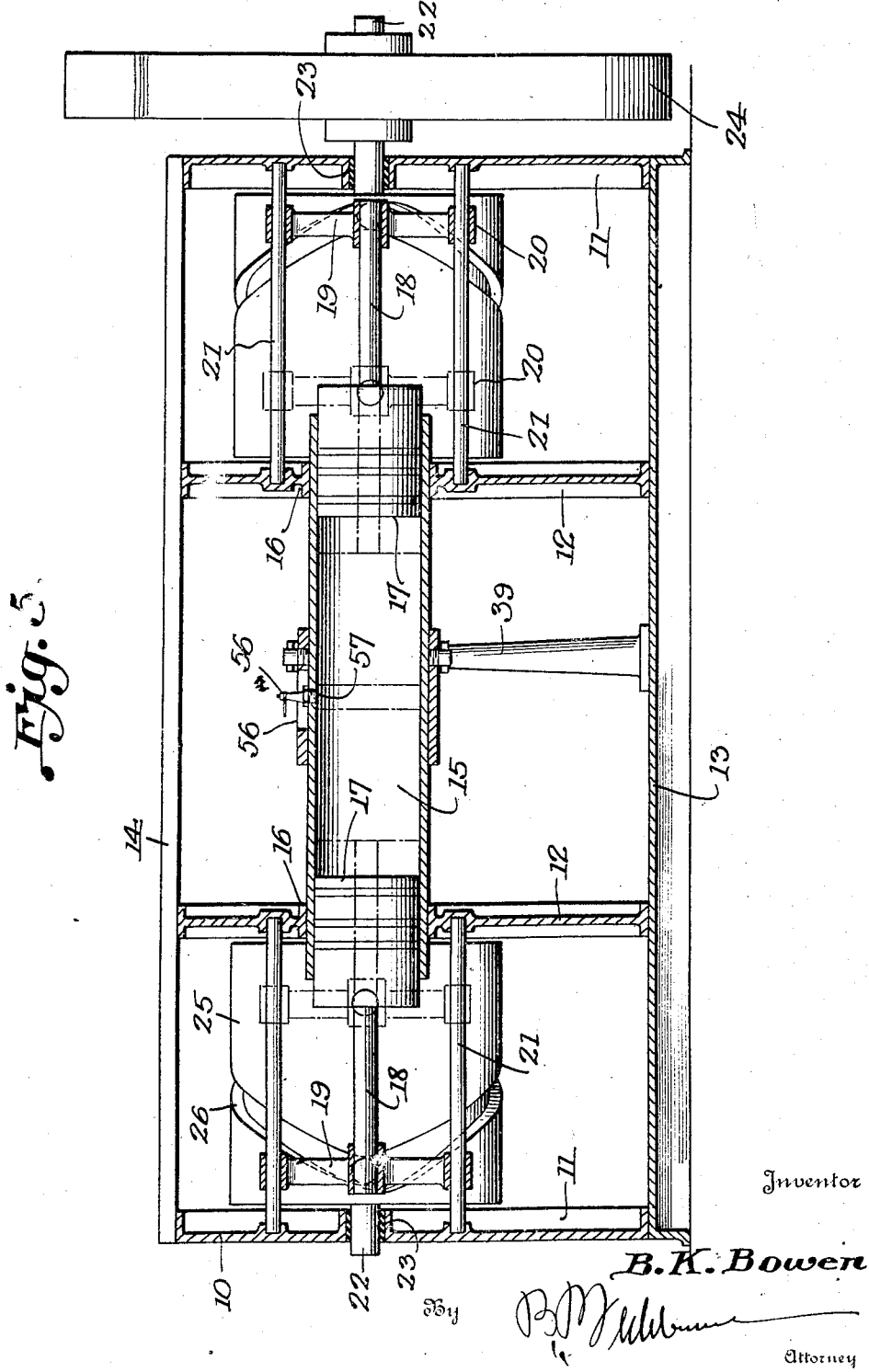
Figure 6:
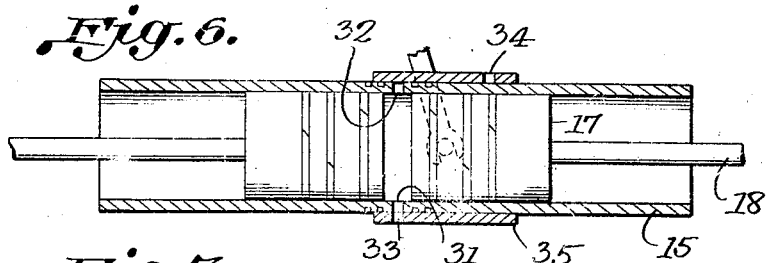
Figure 7:
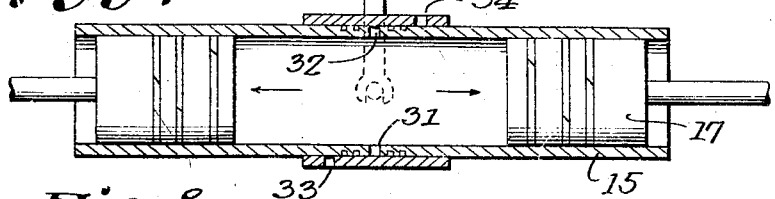
Figure 8:
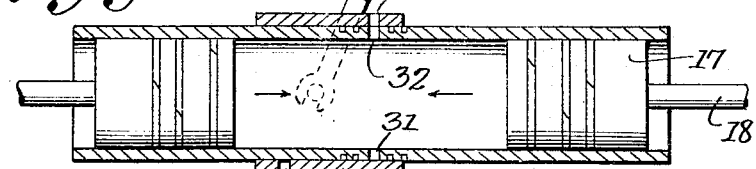
Figure 9:
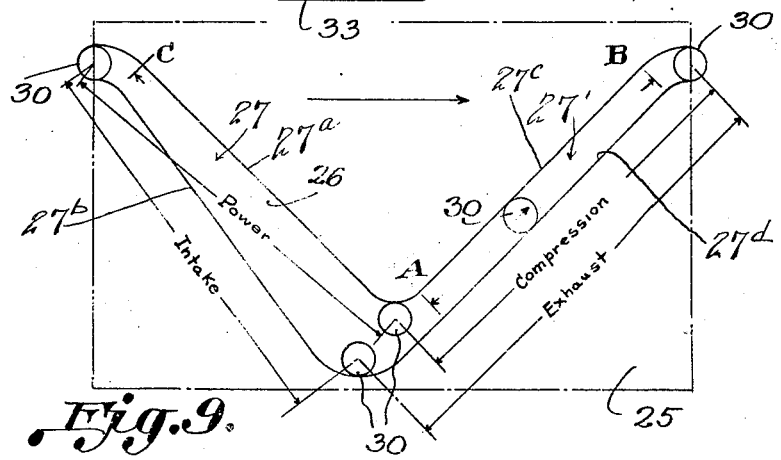

In the accompanying drawings forming a part of the specification, and in which like numerals are employed to designate like parts throughout the same, Figure 1 is a plan view of an engine embodying my invention, Figure 2 is a side elevation of the same, Figure 3 is a transverse section taken on line 3—3 of Figure 1, Figure 4 is a transverse section taken on line 4—4 of Figure 1, Figure 5 is a vertical longitudinal section, taken approximately on line 5—5 of Figure 1, Figure 6 is a central longitudinal section through the cylinder, showing the pistons at the beginning of the intake stroke, Figure 7 is a similar view showing the pistons approaching the end of the power stroke, Figure 8 is a similar view showing the pistons approaching the end of the exhaust stroke, and, Figure 9 is a diagrammatic view of the cam groove.

In the drawings, wherein for the purpose of illustration is shown a preferred embodiment of my invention, the numeral 10 designates a frame work, as a whole, embodying transverse uprights 11 and 12. These uprights may be rigidly mounted upon a base 13, and are connected at their tops by rails 14 or the like.

The numeral 15 designates a horizontal cylinder, extending longitudinally within the frame, with its ends rigidly held within flanged openings 16, formed in the uprights 12. Mounted to reciprocate within the cylinder 15 are pistons 17, connected with rods 18, extending outwardly for rigid connection with cross heads 19. These cross heads are provided at their ends with sleeves 20, rigidly secured thereto, sliding upon horizontal guide rods 21. These guide rods are disposed in vertical alignment above and below the cylinder, and are mounted in the transverse uprights 11 and 12, as shown.

The numeral 22 designates a main power shaft extending longitudinally of the frame 10, near its center. This shaft is journaled in bearings 23, as shown. The power shaft 22 carries a fly wheel 24, and the power is taken from the shaft 22 by any suitable means.

Rigidly mounted upon the power shaft 22, between the uprights 11 and 12, are cam cylinders 25, having cam grooves 26. One of these cam grooves is shown diagrammatically in Figure 9, and as is indicated therein, the cam groove is in the nature of a screw thread. Each cam groove embodies oppositely arranged portions 27, extending to points near the outer and inner ends of the cylinder 25, where they lead into each other. The points of union of the portions 27 and 27', constitute the extreme inner and outer points of travel of the roller. A pin 29 is rigidly mounted upon each cross head 19, and carries a roller 30, rotatable thereon. This roller travels within the cam groove 26.

The portion 27 and cam groove 26 is provided with an intake wall $27^a$ and a power stroke wall $27^b$. The wall $27^b$ diverges with respect to the wall $27^a$, and extends at a lesser angle with respect to the axis of rotation of the cam cylinder 25. The walls 27ᶜ and 27ᵈ of the portion 27' are parallel, as shown. The advantage in having the wall 27ᵇ arranged at a reduced angle with the axis of rotation of the cam cylinder, is to increase the leverage of the engine.

I will now proceed to describe the inlet and exhaust means for the cylinder. The cylinder is provided near its center and upon diametrically opposite points with intake and exhaust ports 31 and 32. These ports are adapted for coaction, respectively, with intake and exhaust ports 33 and 34, formed upon a sliding sleeve-valve 35. The ports 33 and 34 are arranged near the ends of the sleeve-valve as shown.

The sleeve-valve 35 is provided upon its top and bottom with trunnions 36, pivotally engaging the forked end 37 of a lever 38. This lever is pivoted upon a post 39, as shown at 40. The rear end of the lever is provided with a longitudinal slot 41, within which is pivotally mounted a roller 42, as indicated at 43. This roller travels within a groove 44, formed in the periphery of a cam wheel 45. The groove 44 includes a straight part 46, which is about two-sixths or one-third of the circumference of the cam wheel 45. When the roller 42 is in the part 46 of the groove, the lever 38 is held in the intermediate position, and the sleeve-valve 35 occupies the position shown in Figures 1 and 7, whereby both ports 31 and 32 are covered. The sleeve-valve is held in this position while the pistons are traveling inwardly upon the compression stroke, and then outwardly upon the firing stroke, the cam wheel 45 is turned in the direction of its arrow sufficiently, whereby the roller 42 engages in the offset straight part 47 of the groove, and the sleeve-valve 35 is shifted to the left, to assume the position shown in Figure 8. The offset straight part 47 is about one-sixth of the circumference of the cam wheel 45, and when the lever 38 is shifted to the exhaust position, Figure 8, the sleeve-valve 35 will be held in this exhaust position until the pistons have reached the end of the inward stroke, whereby the products of combustion will be expelled through the exhaust ports 32 and 34. When the pistons have reached the inner end of the inward stroke, the offset straight part 48 of the groove 44 is reached, and the lever 38 is then shifted to the right, Figure 6, to the intake position. The straight part 48 extends for about a sixth of the circumference of the cam wheel 45, and hence the sleeve-valve 35 is retained in the intake position, Figure 6, during the outward intake stroke of the pistons, whereby the fresh charge is drawn in through the ports 31 and 33. When the end of the intake stroke is reached, the part 46 receives the roller 42, and the lever 38 is again returned to the intermediate position, whereby both intake and exhaust ports are closed, and the compression and firing strokes occur, as above described. The combined lengths of the straight parts 46, 47, and 48, equal two-thirds of the circumference of the cam wheel 45, and the remaining one-third part is present in the inclined parts of the grooves connecting the straight parts.

Considering more particularly Figure 9, the cam cylinder 25 is considered as rotating in the direction of the arrow. With the pistons 17 at the beginning of the intake stroke, Figure 6, the roller 30 will be at the upper end of the groove member 27, and engaging the wall 27ᵃ. The rotation of the cam cylinder 25 effects the outward movement of the roller and its piston. By the time the roller has reached the lower end of the groove portion 27 and is passing into the lower end of the portion 27', the valve 35 will be shifted to the intermediate position, Figure 7, for the compression stroke. The rotation of the cylinder 25 in the direction of the arrow will now cause the roller to move inwardly for compressing the charge. When the inner end of the groove portion 27' is reached, the roller 30 passes into the groove portion 27, while the valve 35 remains in the intermediate or closed position, and the pistons move outwardly upon the power stroke. Upon this power stroke, the roller 30 travels downwardly through the groove portion 27, in contact with the wall 27ᵇ. When the roller 30 reaches the lower end of the groove member 27 it enters the lower end of the groove member 27', and is engaged by the wall 27ᵈ and hence moved inwardly, while the valve 35 is shifted to the exhaust position, Figure 8, and the piston is moved inwardly to expel the products of combustion from the cylinder.

The cam wheel 45 is rigidly mounted upon a counter shaft 49, and has a gear 50 rigidly secured thereto. This gear engages a gear 51, mounted upon the power shaft 22. The gear 51 has a circumference of about one fourth of the gear 50.

The numeral 52 designates an inlet pipe, having suitable communication with a carburetor or the like, and having its end 53 arranged in slidable contact with the outer face of the valve 35. The numeral 54 designates an exhaust pipe, having its intake end 55 in slidable contact with the outer face of the sleeve-valve 35 and adapted for communication with the exhaust port. The pipes 52 and 54 may be held in the proper position by any suitable means.

The numeral 56 designates a spark plug, screw-threaded within an opening 57, formed in the central portion of the cylinder 15. The outer portion of the spark plug projects through a longitudinal slot 58, formed in the sleeve-valve 45, whereby the spark plug may have suitable connection with the usual ignition circuit.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In an engine of the character described, a frame, a power shaft extending longitudinally of the frame, near its center, a cylinder mounted within the frame upon one side of the power shaft, said cylinder being provided between its ends with inlet and exhaust ports, a sleeve-valve slidably mounted upon the exterior of the intermediate portion of the cylinder and having ports to cooperate with said inlet and exhaust ports, inlet and exhaust means coacting with the ports of the sleeve valve, pistons mounted to reciprocate within the ends of the cylinder, piston rods connected with the pistons, cam cylinders mounted upon the power shaft and provided with cam grooves, rollers connected with the piston rods and operating within said cam grooves, a counter shaft arranged upon the opposite side of the power shaft and carried by the frame, means whereby the counter shaft is driven by the power shaft, a cam wheel mounted upon the counter shaft and having a cam groove, a support arranged between the cylinder and power shaft, and a lever pivoted upon the support and connected with the sleeve valve and having its opposite end provided with an element operating within the cam groove of the cam wheel.

2. In an engine of the character described, a frame, a power shaft mounted within the frame, a cylinder mounted within the frame upon one side of the power shaft, a counter shaft mounted within the frame upon the opposite side of the power shaft, said shafts and cylinder being parallel, pistons mounted to reciprocate within the ends of the cylinder, cam cylinders mounted upon the ends of the power shaft and having cam grooves, elements connected with the piston rods and extending into the cam grooves, a sleeve-valve slidably mounted upon the exterior of the intermediate portion of the cylinder, a cam wheel rigidly mounted upon the counter shaft and having a cam groove, a lever pivotally mounted at a point between the power shaft and the cylinder and connected with the sleeve-valve to shift it and having a part engaging within the cam groove, and gearing connecting the power shaft and the counter shaft.

3. In an engine of the character described, a frame, a power shaft mounted within the frame, a cylinder mounted within the frame upon one side of the power shaft and arranged parallel therewith, said cylinder being provided between its ends with ports, a sleeve-valve slidable upon the intermediate portion of the cylinder to cover and uncover the ports, a counter shaft mounted within the frame upon the opposite side of the power shaft, cam cylinders mounted upon the ends of the power shaft and having cam grooves, pistons mounted to reciprocate within the ends of the cylinder, piston rods connected with the pistons, elements carried by the piston rods and extending into said cam grooves, a cam wheel mounted upon the counter shaft and provided with a cam groove having parts disposed in different planes, said parts being of suitable lengths, for the proper operation of the sleeve-valve, a pivoted lever having a part projecting into the cam groove of the cam wheel and having pivotal connection with the sleeve-valve, and gearing connecting the power shaft and the counter shaft.

In testimony whereof I affix my signature.

BENJAMIN K. BOWEN.